US009272299B2

(12) United States Patent
Carta

(10) Patent No.: US 9,272,299 B2
(45) Date of Patent: Mar. 1, 2016

(54) DISPENSER

(75) Inventor: Lamberto Carta, Pescara (IT)

(73) Assignee: APTAR ITALIA S.P.A., San Giovanni Teatino (CH) (IT)

( * ) Notice: Subject to any disclaimer, the term of this patent is extended or adjusted under 35 U.S.C. 154(b) by 0 days.

(21) Appl. No.: 14/235,590

(22) PCT Filed: Jul. 31, 2012

(86) PCT No.: PCT/IT2012/000236
§ 371 (c)(1), (2), (4) Date: Jan. 28, 2014

(87) PCT Pub. No.: WO2013/018117
PCT Pub. Date: Feb. 7, 2013

(65) Prior Publication Data

US 2014/0166700 A1 Jun. 19, 2014

(30) Foreign Application Priority Data

Aug. 3, 2011 (IT) ............................ RM2011A0419

(51) Int. Cl.
*G01F 11/00* (2006.01)
*B05B 11/00* (2006.01)

(52) U.S. Cl.
CPC ......... *B05B 11/3001* (2013.01); *B05B 11/0016* (2013.01); *B05B 11/305* (2013.01); *B05B 11/3023* (2013.01); *B05B 11/3074* (2013.01)

(58) Field of Classification Search
CPC ............ B05B 11/0016; B05B 11/3001; B05B 11/3023; B05B 11/305; B05B 11/3074
USPC ............................ 222/384, 321.9, 321.7, 320
See application file for complete search history.

(56) References Cited

U.S. PATENT DOCUMENTS

| | | | | |
|---|---|---|---|---|
| 5,738,250 | A * | 4/1998 | Gillingham et al. | 222/153.13 |
| 6,230,942 | B1 * | 5/2001 | Kuo | 222/321.9 |
| 2003/0034362 | A1 * | 2/2003 | Blake | 222/321.9 |
| 2008/0083784 | A1 * | 4/2008 | Foster et al. | 222/153.13 |

FOREIGN PATENT DOCUMENTS

| | | | |
|---|---|---|---|
| EP | 2 338 607 | A1 | 6/2011 |
| WO | 2010/113199 | A1 | 10/2010 |

OTHER PUBLICATIONS

International Search Report, dated Jan. 3, 2013, from corresponding PCT application.

* cited by examiner

*Primary Examiner* — Frederick C Nicolas
*Assistant Examiner* — Bob Zadeh
(74) *Attorney, Agent, or Firm* — Young & Thompson

(57) ABSTRACT

A dispenser includes a hollow containment body with a hole located inside the bottle and an orifice for pumping a liquid product contained inside the bottle. The dispenser also includes a ring nut, a piston, and a hollow stem slidable inside the body and associated with a dispensing spout to actuate the piston in order to dispense fluid contained in the bottle. The body further includes an aperture to selectively place an ambient air inlet passage in fluid communication with the hole in the body. The ring nut has a first substantially cylindrical portion and a second substantially cylindrical portion which are mutually coupled to define the air inlet passage between them.

17 Claims, 3 Drawing Sheets

DISPENSER

TECHNICAL FIELD

This invention relates to a dispenser, that is to say, a dispensing device applicable to the neck of a bottle in order to deliver the liquid contained in the bottle.

BACKGROUND ART

More specifically, this invention relates to a dispenser generally consisting of a substantially cylindrical hollow containment body insertable into the neck of a bottle.

The containment body is connected to a threaded ring nut which is screwed to the neck of a bottle.

More specifically, the containment body comprises an annular portion which faces an annular portion of the ring nut and connected thereto.

At a first end of it, the containment body has an inlet orifice for the liquid in the bottle. The orifice is opened or closed by a ball which is free to roll inside the containment body, in particular inside a dispensing chamber included therein.

The dispensing chamber is defined by the space between a piston, guided by a hollow stem slidable inside the containment body, and the bottom portion (where the orifice is) of the containment body.

Between the piston and the stem there are means for opening and closing the hollow in the stem in such a way as to selectively place the inside of the stem in fluid communication with the dispensing chamber.

The movement of the stem is guided by a retaining ring attached to the containment body which also serves the function of piston limit stop.

In other words, the retaining ring defines the upper limit of the dispensing chamber, preventing the piston from coming out of the dispensing chamber.

When the piston creates an overpressure inside the dispensing chamber, the hollow in the stem is in fluid communication with the dispensing chamber and the fluid in the dispensing chamber rises along the stem and is delivered through a spout associated therewith.

In this configuration, the ball is in the lowered position and occludes the orifice.

When the piston creates a negative pressure inside the dispensing chamber, the hollow in the stem is not in fluid communication with the dispensing chamber and fluid is sucked into the dispensing chamber from the bottle.

In this configuration, the negative pressure in the dispensing chamber causes the ball to rise, leaving the orifice open.

In this type of dispenser, the piston is made to slide inside the containment body by opposing the action of a spring whose function is to keep the stem and the piston connected thereto in the raised position.

More specifically, by applying a compressive action on the stem, the piston slides in the dispensing chamber, reducing the size of the chamber and thus creating an overpressure inside it.

When the compressive action on the stem ceases, the spring takes the movable stem/piston assembly back to the raised position, increasing the size of the dispensing chamber and thereby creating a negative pressure in it.

The pressing action on the stem is exerted on the delivery spout located at the upper end of the stem and in fluid communication therewith in order to deliver to the outside atmosphere the liquid contained in the bottle.

At each delivery, a volume of air equal to the liquid delivered must enter the bottle in order to keep the balance of pressure between the inside of the bottle and the outside atmosphere.

For this purpose, prior art dispensers have a fluid inlet between the fastening ring nut and the dispensing spout connected thereto, that is to say, a passage through which air is allowed in so that air from the outside atmosphere can flow into apertures made inside the containment body.

More specifically, these apertures guarantee that the air drawn in between spout and ring nut can reach a hole made in the outside surface of the containment body inside the bottle.

These apertures place the outside atmosphere in fluid communication with the aforementioned hole when the piston is in the lowered position, that is to say when the piston is rising inside the dispensing chamber.

That way, the liquid sucked out of the bottle and into the dosing chamber is replaced by air drawn into the bottle.

When the piston is in the raised position, the apertures occlude the fluid communication between the outside atmosphere (that is to say, between the air inlet passage) and the inside of the bottle (that is to say, the hole made in the containment body).

The prior art dispensers described above have some disadvantages.

In particular, under falling water—for example in a shower—the top of the dispenser (that is, the part with the spout), which is directly exposed to the falling water, is covered by a film of water.

Thus, when the dispenser is operated, water is drawn into the containment body, in addition to air, through the passage between the spout and the ring nut.

The water that enters the containment body follows the same path as the air and, through the apertures, finds its way into the bottle, where it mixes with the liquid contained in the bottle.

This dilutes the liquid in the bottle which, after prolonged use of the dispenser, may become heavy and unacceptable.

Also known are dispensers which can overcome the disadvantage just described. These dispensers have protuberances which keep the inside surface of the ring nut spaced from an annular shoulder of the containment body. More specifically, the ring nut has an annular portion positioned to face the shoulder of the containment body from above. That way, the protuberances define a series of air passage channels designed to place the outside atmosphere in fluid communication (through the threaded inside surface of the ring nut) with the hole made in the outside surface of the containment body inside the bottle.

This minimizes water entry when the dispenser is used under falling water because the inlet passage which places the hole in fluid communication with the outside atmosphere is not directly exposed to the falling water.

Also, the slidable coupling between ring nut and delivery spout may be made in such a way as to reduce or even eliminate entry altogether.

Dispensers of this kind, too, are not free of disadvantages, however.

In effect, it should be noted that in this case the ring nut, which is made as one piece, is not very adaptable to the surface of the delivery spout. That means the coupling between the ring nut and the spout may in some cases be poorly sealed and in others, excessively stiff on account of high friction between the two parts.

Moreover, excessive expansion of the external sealing washer on account of over-tightening the ring nut obstructs the air inlet path, making it difficult for the replacement air to flow into the bottle.

DISCLOSURE OF THE INVENTION

In this context, the technical purpose which forms the basis of this invention is to propose a dispenser which overcomes the above mentioned disadvantages of the prior art.

More specifically, the aim of this invention is to provide a dispenser which prevents water from mixing with the liquid inside the bottle, even when used under falling water, and which is at the same time reliable and able to provide a tight seal between the ring nut and the spout.

The technical purpose indicated and the aim specified are substantially achieved by a dispenser with the technical features set out in one or more of the appended claims.

BRIEF DESCRIPTION OF THE DRAWINGS

Further features and advantages of the invention are more apparent in the detailed description below, with reference to a preferred, non-limiting, embodiment of a dispenser as illustrated in the accompanying drawings, in which.

DETAILED DESCRIPTION OF THE PREFERRED EMBODIMENTS OF THE INVENTION

Figure 1:
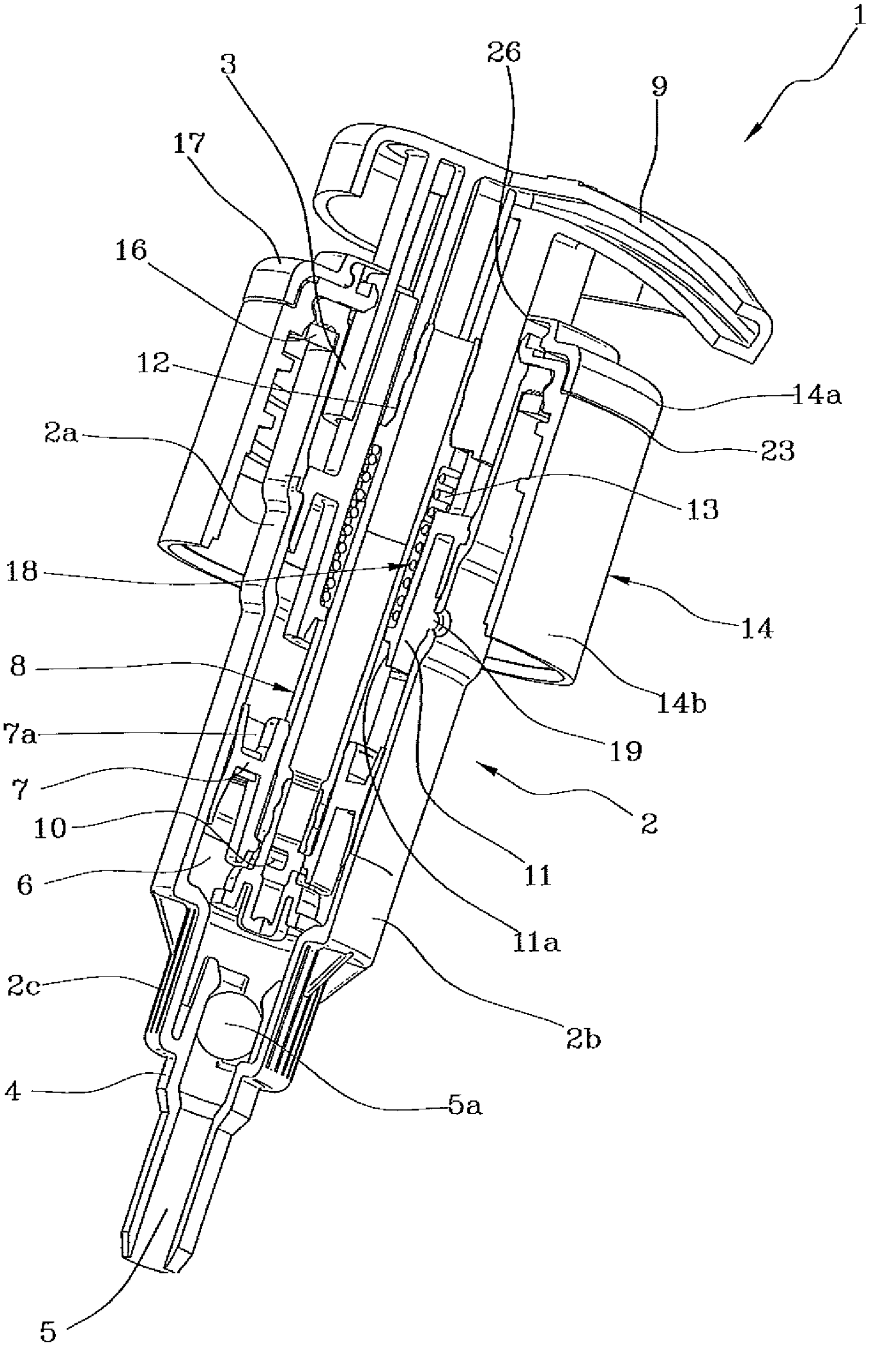
FIG. 1 is a perspective view, partly in cross section, of a dispenser according to this invention.

With reference to the accompanying drawings, a dispenser according to this invention is denoted by the numeral 1.

The dispenser 1 comprises a hollow containment body 2 insertable into a bottle, not illustrated in the drawings because it does not from part of the invention.

The containment body 2 is axisymmetric in shape and comprises a top portion 3 and a bottom portion 4.

The top portion 3 of the containment body 2 is open and serves to allow the dispenser's components (described below) to be inserted into the hollow body 2.

The bottom portion 4 is provided with an orifice 5 through which the liquid contained in the bottle enters the containment body 2.

The orifice 5 is engaged by a ball 5*a* whose function is to open or close the orifice 5 in the manner which will become clearer as this description continues.

The containment body 2 is substantially funnel-shaped.

More specifically, the containment body 2 comprises a first section 2*a* which extends from the top portion 3 towards the bottom one 4, and a second section 2*b* located under the first section 2*a*.

The second section 2*b* defines a dispensing chamber 6 for the dispenser 1.

Under the dispensing chamber 6 there is a third section 2*c* from which the orifice 5 extends.

The three sections differ in their transversal dimensions so as to define the aforementioned funnel-shaped configuration of the containment body 2.

More specifically, the second section 2*b*, the one defining the dispensing chamber 6, is substantially cylindrical.

Inside the hollow body 2 there is a piston 7 which is movable between a raised position and a lowered position (illustrated in FIG. 1).

The piston 7 comprises an outside surface designed to come into contact with the inside wall of the second portion 2*b* of the hollow body 2.

The outside surface of the piston 7 slides in the dispensing chamber 6 between the raised position, where the volume of the dispensing chamber is at its largest, and the lowered position, where the volume of the dispensing chamber 6 is at its smallest.

As the piston 7 moves along the inside wall of the second portion, its outside surface creates a fluid-tight seal in such a way that the liquid in the dispensing chamber cannot pass though the slidable coupling between the piston 7 and the dispensing chamber 6.

The dispenser 1 also comprises a hollow stem 8 slidable inside the containment body 2 between a raised position and a lowered position (FIG. 1).

The stem 8 drives the piston 7, that is to say, it moves the latter within the dispensing chamber 6.

Through its hollow, the stem 8 also serves to transfer the liquid in the dispensing chamber 6 to a spout 9 which delivers the liquid to a user.

More specifically, the stem 8 comprises at least one window 10, preferably two, opposite each other, to place the hollow of the stem 8 selectively in fluid communication with the inside of the containment body 2, in particular with the dispensing chamber 6.

The windows 10 are made in the side wall of the stem 8.

The stem 8 is partly slidable relative to the piston 7 so that the window 10 is occluded or released by the piston 7.

More specifically, the stem 8 is inserted into a through hole in the piston 7.

The stem 8 is free to slide in the through hole by an amount such as to cause the window 10 to open into the dispensing chamber 6.

The end part of the stem 8 is therefore closed, so that the liquid in the dispensing chamber 6 can enter the hollow in the stem 8 only through the window 10.

Preferably, the relative motion between the stem 8 and the piston 7 is delimited by upper and lower stops on the stem 8.

To guide the stem 8 in its movement within the containment body 2, the dispenser 1 comprises a stop ring 11 attached to and inserted in the containment body 2.

The stop ring 11 is located in the first section 2*a* of the body 2 and has a hole 12 for the passage of the stem 8.

The dispenser 1 comprises elastic means 13 for opposing the free sliding movement of the stem (and hence of the piston) inside the containment body 2.

The elastic means 13, consisting preferably of a spring, may operate between a lower end portion of the stem 8 and the bottom portion 4 of the containment body, or between the stop ring 11 and the stem 8.

It should be noted that the latter configuration prevents the spring 13 from coming into contact with the liquid in the dispensing chamber 6.

The spring 13 is placed concentrically round the outside of the stem 8.

Acting on the spout 9, in particular by pressing it, causes the stem 8 and the piston 7 to translate within the dispensing chamber 6 (FIG. 1).

In a first step of this translation, the piston 7 remains stationary on account of the friction between the piston wall and the wall of the dispensing chamber 6, and also as a result of the overpressure created in the liquid on account of the volume of the chamber being reduced.

In this step, the stem 8 translates relative to the piston 7 leaving the window 10 (situated at the lower end of the stem 8) free.

The subsequent movement of the stem 8 drives the piston 7 along with it, causing the liquid inside the dispensing chamber 6 to be compressed and to flow through the window 10 and hence through the spout 9 to the outside atmosphere.

When the user releases the spout 9, the entire system returns to the rest position under the action of the spring 13.

During the upward return movement, the stem 8 moves before the piston 7 (which is held back by the friction against the walls of the dispensing chamber 6) thereby occluding the window 10.

This prevents the liquid present in the stem 8 and in the spout 9 from being sucked back into the dispensing chamber 6.

The translation during the return movement of the piston 7 in the dispensing chamber 6 creates a negative pressure inside the dispensing chamber 6 which causes liquid to be sucked in through the orifice 5 of the containment body 2.

As mentioned above, the containment body 2 is insertable into the bottle.

To hold back and keep the containment body 2 inside the bottle, there is a threaded ring nut 14 which can be screwed to the neck of the bottle.

Figure 2:
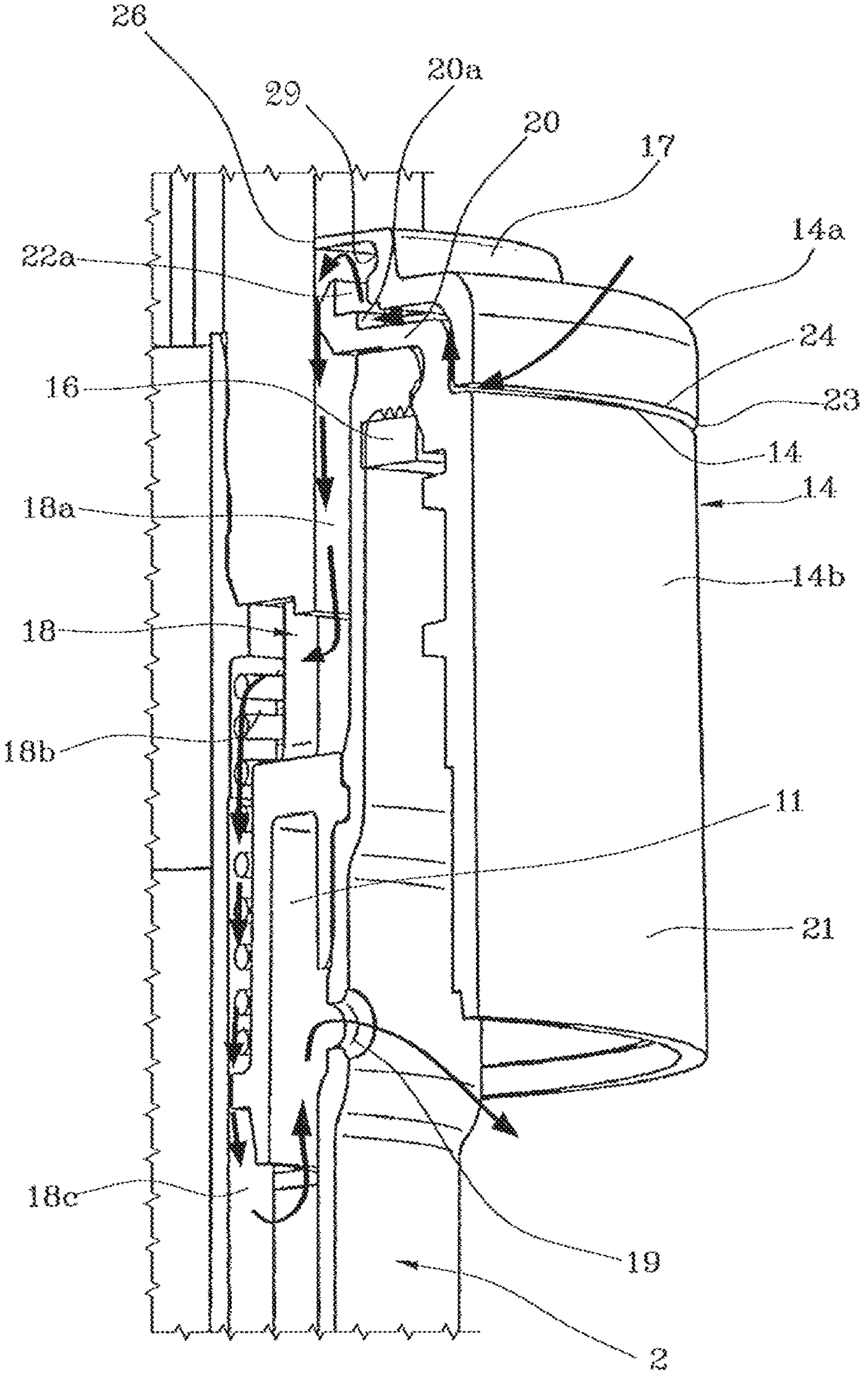
FIG. 2 is an enlarged view of some details of the dispenser of FIG. 1.

As better illustrated in FIG. 2, the ring nut 14 is associated with an annular lip 16 of the containment body 2 in such a way as to cover the selfsame lip 16.

The lip 16 of the containment body 2 is located on the top portion 3 of the containment body 2 and surrounds the upper opening thereof.

The ring nut 14 also comprises a hole to allow the stem 8 and the spout 9 to pass slidingly through it.

At each delivery, a volume of air equal to the liquid delivered enters the bottle through an aperture 18 which extends inside the containment body 2 and which is in fluid communication with a hole 19 extending through the containment body 2 and facing the inside of the bottle (as shown in detail by the arrow in FIG. 2).

The aperture 18 is also in fluid communication with an inlet for the passage of air from the outside atmosphere.

Preferably, the aperture 18 extends from a region above the stop ring 11, that is to say, between the stop ring 11 and the top portion 3 of the containment body 2 to a region below the stop ring 11, that is to say, between the stop ring 11 and the piston 7.

The hole 19 in the containment body 2 is located below the ring 11 and above the piston 7.

More specifically, the aperture 18 comprises a first portion **18*a* located in the first section 2*a* of the containment body 2**.

The first portion **2*a* is only partly engaged by the stop ring 11**.

The aperture 18 also comprises a second portion **18*b* defined between the stem 8 and the stop ring 11**.

It should be noted that the stem 8 slides in the stop ring 11 in a non fluid-tight manner.

The stop ring 11 is coupled in fluid-tight manner to the inside wall of the containment body 2.

The aperture 18 also comprises a third portion **18*c* extending between the piston 7 and the stop ring 11**.

The third portion directly faces the hole 19 in the containment body 2 (FIG. 2).

When the dispenser 1 is at rest (that is to say, when the spout 9 is not pressed), the piston 7 is engaged in fluid tight manner with the stop ring 11, thus occluding the aperture 18 and preventing air from entering the bottle.

More specifically, an upper portion **7*a* of the piston 7 is engaged in fluid-tight manner in an undercut 11*a* of the stop ring 11**.

When the dispenser is activated (that is to say, when the stem 8 drives the piston 7 downwards in compression or upwards) there is no longer a fluid-tight seal between the stop ring 11 and the piston 7 (FIG. 1).

Advantageously, the ring nut 14 has a first substantially cylindrical portion **14*a* and a second substantially cylindrical portion 14*b* which are mutually coupled to define between them the passage for the inflow of air towards the aperture 18**.

Figure 3:
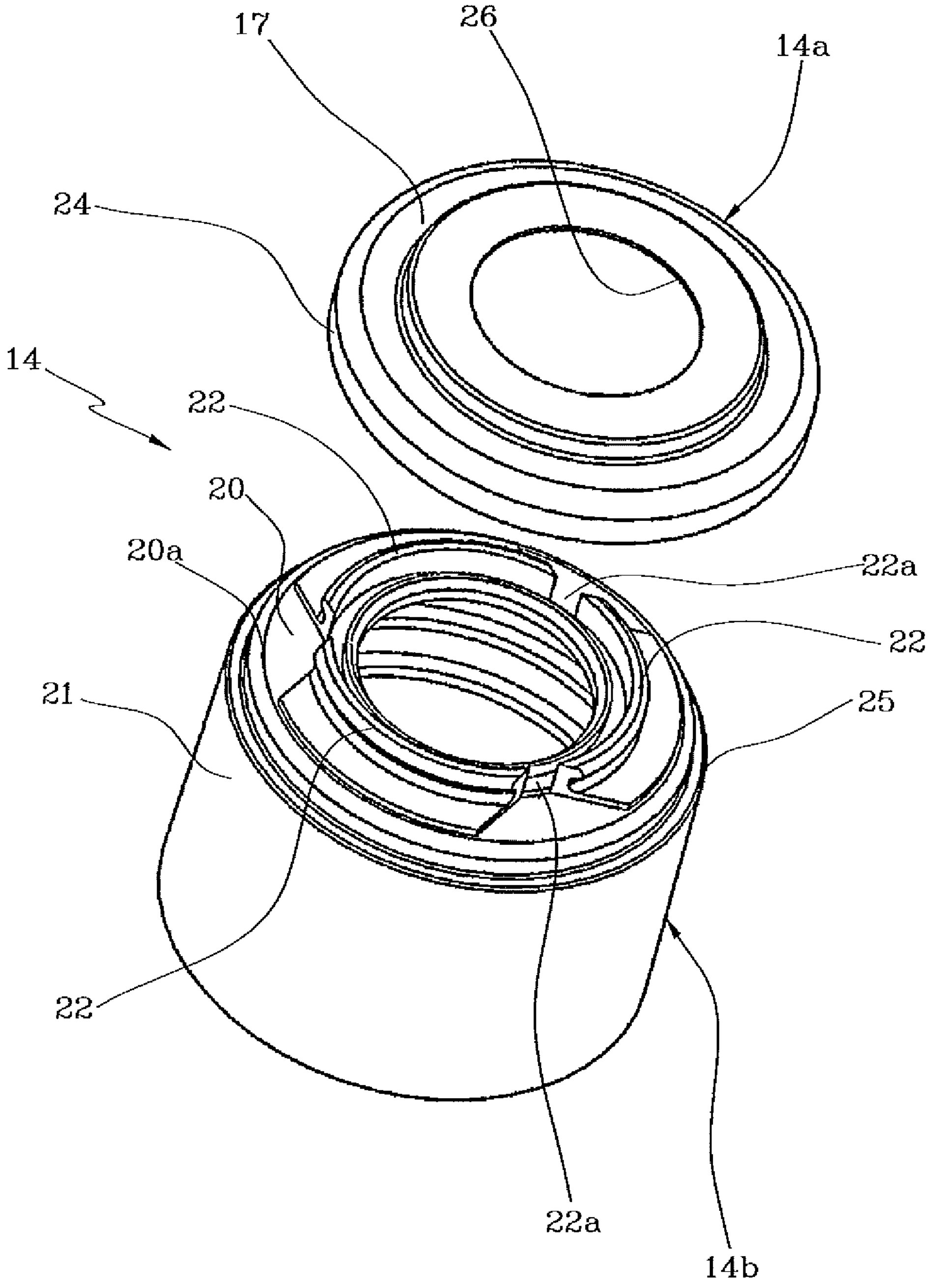
FIG. 3 is an exploded perspective view of a ring nut forming part of the dispenser of FIG. 1.

More specifically, with reference in particular to the detail of FIG. 3, the first substantially cylindrical portion **14*a* has an annular shape and a hole internally of it in order to allow the stem 8 and the spout 9** to pass through.

The circular edge 26 which delimits the internal hole of the upper portion **14*a* of the ring nut 14 is suitably shaped to match in a fluid tight manner the outside surface of the spout 9 so that water cannot pass through the interstice between the hole of the ring nut and the spout 9 (which slides therein) and thus cannot find its way into the containment body 2. Sealing means (not illustrated) such as, for example, a washer fitted in the hole of the ring nut 14, a concertina between the ring nut 14 and the spout 9**, or any other device suitable for the purpose, can be added to improve fluid tightness.

Further, the first cylindrical portion **14*a* has a convex external surface 17 directed outwards and a concave internal surface 29, directed inward and facing an upper part of the second substantially cylindrical portion 14*b***.

More in detail, the concave internal surface 29 is engaged with an annular upper wall 20 of the second cylindrical portion **14*b*** to define the air passage together therewith.

It should be noted that the second cylindrical portion **14*b* has a cylindrical side wall 21 whose inside surface is threaded so it can be screwed to the bottle neck, and extending transversely to the upper wall 20**.

Still with reference to FIG. 3, the upper wall 20 has an external surface **20*a* which is coupled to the concave internal surface 29 of the first portion 14*a*. That way, as indicated by the arrow in FIG. 2, the air inlet passage is defined between the concave internal surface 29 and the external surface 20*a* of the upper annular wall 20**.

It should also be noted that the annular upper wall 20 has a series of relief portions 22 which are spaced from each other to define a plurality of air passages **22*a*** arranged in a circle.

It should be noted that there may be any number of relief portions 22, and hence any number of passages **22*a*, depending on the size of the dispenser and of the amount of air to be allowed into the aperture 18**.

When the two cylindrical portions **14*a*, 14*b* are coupled to each other (FIGS. 1 and 2), a gap 23** for the inflow of air from the outside atmosphere is obtained.

More specifically, the first cylindrical portion **14*a* has a circular outer border 24 located at an edge zone 25 of the second cylindrical portion 14*b* defined between the side wall 21 and the upper wall 20. That way, the air passage gap 23 is defined between the circular outer border 24 and the zone 25 of the second cylindrical portion 14*b***.

The circular shape of the gap 23 thus limits the entry of water into the air passage.

The invention achieves the preset aim.

In effect, the two portions making up the ring nut 14 form an air passage which minimizes water entry when the dispenser is used under falling water because the inlet passage which places the aperture 18 in fluid communication with the outside atmosphere is not directly exposed to the falling water. On the other hand, the entry of air, and at the same time, of water, is prevented in the zone where the ring nut 14 is coupled to the spout 9 in fluid-tight manner and which is more exposed to the falling water.

Advantageously, the structure of the ring nut 14 is such that its single portions can be made of different materials. For example, a hard material may be used for the second portion 14*b*, which is screwed to the neck of the bottle, and a softer material may be used for the first portion 14*a* which is in fluid-tight contact with the spout 9.

Moreover, leaving a clearance, albeit limited, between the two portions of the ring nut, allows the upper portion 14*a* to move relative to the lower portion 14*b*, thus making it easier for the sealing surface of the portion 14*a* to be correctly positioned around the surface of the spout.

That means the ring nut 14 is more compliant, with obvious advantages in terms of the fluid tightness of the ring nut 14.

The invention claimed is:

1. A dispenser comprising:

a containment body (2) which is hollow and at least partly insertable into a bottle, the containment body (2) having a hole (19) located inside the bottle and an orifice (5) for pumping a liquid product contained inside the bottle;

a ring nut (14) able to be engaged on a neck of the bottle and externally associated with the containment body (2);

a piston (7) slidable inside the containment body (2) between a raised position and a lowered position;

a hollow stem (8) slidable inside the containment body (2) and associated with a dispensing spout (9) to actuate the piston (7) in order to dispense the fluid contained in the bottle;

at least one aperture (18) formed in the containment body (2) to selectively place in fluid communication an ambient air inlet passage with the hole (19) in the containment body (2), wherein the ring nut (14) has a first substantially cylindrical portion (14*a*) and a second substantially cylindrical portion (14*b*) which are mutually coupled to define the air inlet passage between the first substantially cylindrical portion (14*a*) and the second substantially cylindrical portion (14*b*); and a stop ring (11) locked in the containment body (2) and inside which the stem (8) slides; the at least one aperture (18) being at least partly formed between the stop ring (11) and the stem (8).

2. The dispenser according to claim 1, wherein the first substantially cylindrical portion (14*a*) has a convex external surface (17) directed outwards and a concave internal surface (29) directed inward and facing an upper part of the second substantially cylindrical portion (14*b*).

3. The dispenser according to claim 2, wherein the second substantially cylindrical portion (14*b*) has a cylindrical side wall (21) whose inside surface is threaded so the dispenser can be screwed to the neck of the bottle, and an annular upper wall (20) whose external surface (20*a*) faces the concave internal surface (29) of the first substantially cylindrical portion (14*a*).

4. The dispenser according to claim 3, wherein the first substantially cylindrical portion (14*a*) also comprises a circular outer border (24), located at an edge zone (25) of the second substantially cylindrical portion (14*b*) defined between the cylindrical side wall (21) and the upper annular wall (20); the ring nut (14) defining an air passage gap (23) between the circular outer border (24) and the edge zone (25) of the second substantially cylindrical portion (14*b*).

5. The dispenser according to claim 4, wherein the air passage gap (23) is substantially circular in shape and runs round the entire circumference of the cylindrical side wall (21) of the second substantially cylindrical portion (14*b*).

6. The dispenser according to claim 3, wherein the concave internal surface (29) of the first substantially cylindrical portion (14*a*) is engaged with the annular upper wall (20) of the second substantially cylindrical portion (14*b*); the air inlet passage being defined between the concave internal surface (29) and the annular upper wall (20).

7. The dispenser according to claim 6, wherein the first substantially cylindrical portion (14*a*) also comprises a circular outer border (24), located at an edge zone (25) of the second substantially cylindrical portion (14*b*) defined between the cylindrical side wall (21) and the upper annular wall (20); the ring nut (14) defining an air passage gap (23) between the circular outer border (24) and the edge zone (25) of the second substantially cylindrical portion (14*b*).

8. The dispenser according to claim 6, wherein the annular upper wall (20) of the second substantially cylindrical portion (14*b*) comprises a series of relief portions (22) which are spaced from each other to define a plurality of air passages (22*a*) arranged in a circle.

9. The dispenser according to claim 8, characterized in that the first substantially cylindrical portion (14*a*) also comprises a circular outer border (24), located at an edge zone (25) of the second substantially cylindrical portion (14*b*) defined between the cylindrical side wall (21) and the upper annular wall (20); the ring nut (14) defining an air passage gap (23) between the circular outer border (24) and the edge zone (25) of the second substantially cylindrical portion (14*b*).

10. The dispenser according to claim 1, wherein the stop ring (11) is located between the hole (19) in the containment body (2) and the air passage gap.

11. A dispenser comprising:

a containment body (2) which is hollow and at least partly insertable into a bottle, the containment body (2) having a hole (19) located inside the bottle and an orifice (5) for pumping a liquid product contained inside the bottle;

a ring nut (14) able to be engaged on a neck of the bottle and externally associated with the containment body (2);

a piston (7) slidable inside the containment body (2) between a raised position and a lowered position;

a hollow stem (8) slidable inside the containment body (2) and associated with a dispensing spout (9) to actuate the piston (7) in order to dispense the fluid contained in the bottle; and at least one aperture (18) formed in the containment body (2) to selectively place in fluid communication an ambient air inlet passage with the hole (19) in the containment body (2), wherein the ring nut (14) has a first substantially cylindrical portion (14*a*) and a second substantially cylindrical portion (14*b*) which are mutually coupled to define the air inlet passage between the first substantially cylindrical portion (14*a*) and the second substantially cylindrical portion (14*b*), wherein the first substantially cylindrical portion (14*a*) has a convex external surface (17) directed outwards and a concave internal surface (29) associated with the second substantially cylindrical portion (14*b*), and wherein the second substantially cylindrical portion (14*b*) has a cylindrical side wall (21) whose inside surface is threaded so the dispenser can be screwed to the neck of the bottle, and an annular upper wall (20) whose external surface (20*a*) faces the concave internal surface (29) of the first substantially cylindrical portion (14*a*).

12. The dispenser according to claim 11, wherein the concave internal surface (29) of the first substantially cylindrical portion (14*a*) is engaged with the annular upper wall (20) of the second substantially cylindrical portion (14*b*); the air inlet passage being defined between the concave internal surface (29) and the annular upper wall (20).

13. The dispenser according to claim 12, wherein the first substantially cylindrical portion (14*a*) also comprises a circular outer border (24), located at an edge zone (25) of the second substantially cylindrical portion (14*b*) defined between the cylindrical side wall (21) and the annular upper wall (20); the ring nut (14) defining an air passage gap (23) between the circular outer border (24) and the edge zone (25) of the second substantially cylindrical portion (14*b*).

14. The dispenser according to claim 12, wherein the annular upper wall (20) of the second substantially cylindrical portion (14*b*) comprises a series of relief portions (22) which are spaced from each other to define a plurality of air passages (22*a*) arranged in a circle.

15. The dispenser according to claim 14, characterized in that the first substantially cylindrical portion (14*a*) also comprises a circular outer border (24), located at an edge zone (25) of the second substantially cylindrical portion (14*b*) defined between the cylindrical side wall (21) and the annular upper wall (20); the ring nut (14) defining an air passage gap (23) between the circular outer border (24) and the edge zone (25) of the second substantially cylindrical portion (14*b*).

16. The dispenser according to claim 11, wherein the first substantially cylindrical portion (14*a*) also comprises a circular outer border (24), located at an edge zone (25) of the second substantially cylindrical portion (14*b*) defined between the cylindrical side wall (21) and the annular upper wall (20); the ring nut (14) defining an air passage gap (23) between the circular outer border (24) and the edge zone (25) of the second substantially cylindrical portion (14*b*).

17. The dispenser according to claim 16, wherein the air passage gap (23) is substantially circular in shape and runs round the entire circumference of the cylindrical side wall (21) of the second substantially cylindrical portion (14*b*).

* * * * *